US006262872B1

(12) United States Patent
Messerli et al.

(10) Patent No.: US 6,262,872 B1
(45) Date of Patent: Jul. 17, 2001

(54) ELECTRONIC TRIP UNIT WITH USER-ADJUSTABLE SENSITIVITY TO CURRENT SPIKES

(75) Inventors: Alan Joseph Messerli, Bristol; Mark Frederick Culler, Glastonbury, both of CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/325,605

(22) Filed: Jun. 3, 1999

(51) Int. Cl.[7] .................................................... H02H 3/00

(52) U.S. Cl. ......................... 361/93.2; 361/93.1; 361/94; 702/78

(58) Field of Search .................... 361/93.1, 93.2, 361/93.3, 93.4, 93.9, 94, 78, 79, 80, 86, 87, 83; 702/57, 64, 66, 69, 75, 78; 324/512, 522, 535

(56) References Cited

U.S. PATENT DOCUMENTS

| D. 367,265 | 2/1996 | Yamagata et al. ............. D13/160 |
|---|---|---|
| 2,340,682 | 2/1944 | Powell ............................. 200/147 |
| 2,719,203 | 9/1955 | Gelzheiser et al. ............. 200/144 |
| 2,937,254 | 5/1960 | Ericson .......................... 200/114 |
| 3,158,717 | 11/1964 | Jencks et al. .................. 200/116 |
| 3,162,739 | 12/1964 | Klein et al. ....................... 200/88 |
| 3,197,582 | 7/1965 | Norden ............................. 200/50 |
| 3,307,002 | 2/1967 | Cooper ........................... 200/116 |
| 3,517,356 | 6/1970 | Hanafusa .......................... 335/16 |
| 3,631,369 | 12/1971 | Menocal .......................... 337/110 |
| 3,803,455 | 4/1974 | Willard ........................ 317/33 SC |
| 3,883,781 | 5/1975 | Cotton ........................... 317/14 R |

(List continued on next page.)

FOREIGN PATENT DOCUMENTS

| 819 008 | 12/1974 | (BE) . |
|---|---|---|
| 897 691 | 1/1984 | (BE) . |
| 12 27 978 | 11/1966 | (DE) . |
| 30 47 360 | 6/1982 | (DE) . |
| 38 02 184 | 8/1989 | (DE) . |
| 38 43 277 | 6/1990 | (DE) . |

(List continued on next page.)

Primary Examiner—Michael J. Sherry
Assistant Examiner—Kim Huynh
(74) Attorney, Agent, or Firm—Cantor Colburn LLP; Carl B. Horton

(57) ABSTRACT

A circuit breaker trip unit with user-adjustable sensitivity to current spikes (22) includes a user-adjustable switch (30), a current sensor (32), an analog-to-digital (A/D) converter (34), a microprocessor (36), and a power supply (37). The current sensor (32) is electrically connected to the distribution circuit (10) and provides analog signals indicative of current measurements in the distribution circuit (10) to the A/D converter (34). The A/D converter (34) converts the analog signal to a digital line signal and presents the digital line signal, via a bus (38), to the microprocessor (36). The user-adjustable switch (30) is arranged to provide a signal indicative of a limit value, via a bus (40), to the microprocessor (36). The microprocessor (36) comprises a plurality of registers (42–48) and ROM (50) internal thereto. The ROM (50) includes trip unit application code, e.g., main functionality firmware, including initializing parameters, boot code, and a short circuit protection algorithm. The short circuit protection algorithm compares the line signal stored in the threshold register (48) to a predetermined threshold value stored in the ROM (50). If the line signal exceeds the threshold value, the microprocessor increments a peak count value stored in the peak count register (42). When the peak count reaches the limit value stored in the peak count register (42), a trip signal is generated by the microprocessor (36).

27 Claims, 6 Drawing Sheets

U.S. PATENT DOCUMENTS

| | | | |
|---|---|---|---|
| 4,129,762 | 12/1978 | Bruchet | 200/153 G |
| 4,144,513 | 3/1979 | Shafer et al. | 335/46 |
| 4,158,119 | 6/1979 | Krakik | 200/240 |
| 4,165,453 | 8/1979 | Hennemann | 200/153 G |
| 4,166,988 | 9/1979 | Ciarcia et al. | 335/9 |
| 4,220,934 | 9/1980 | Wafer et al. | 335/16 |
| 4,255,732 | 3/1981 | Wafer et al. | 335/16 |
| 4,259,651 | 3/1981 | Yamat | 335/16 |
| 4,263,492 | 4/1981 | Maier et al. | 200/288 |
| 4,276,527 | 6/1981 | Gerbert-Gaillard et al. | 335/39 |
| 4,297,663 | 10/1981 | Seymour et al. | 335/20 |
| 4,301,342 | 11/1981 | Castonguay et al. | 200/153 SC |
| 4,360,852 | 11/1982 | Gilmore | 361/98 |
| 4,368,444 | 1/1983 | Preuss et al. | 335/166 |
| 4,375,021 | 2/1983 | Pardini et al. | 200/147 B |
| 4,375,022 | 2/1983 | Daussin et al. | 200/148 R |
| 4,376,270 | 3/1983 | Staffen | 335/21 |
| 4,383,146 | 5/1983 | Bur | 200/17 R |
| 4,392,036 | 7/1983 | Troebel et al. | 200/322 |
| 4,393,283 | 7/1983 | Masuda | 200/51.09 |
| 4,401,872 | 8/1983 | Boichot-Castagne et al. | 200/153 G |
| 4,409,573 | 10/1983 | DiMarco et al. | 335/16 |
| 4,435,690 | 3/1984 | Link et al. | 335/37 |
| 4,467,297 | 8/1984 | Boichot-Castagne et al. | 335/8 |
| 4,468,645 | 8/1984 | Gerbert-Gaillard et al. | 335/42 |
| 4,470,027 | 9/1984 | Link et al. | 335/16 |
| 4,479,143 | 10/1984 | Watanabe et al. | 358/44 |
| 4,488,133 | 12/1984 | McClellan et al. | 335/16 |
| 4,492,941 | 1/1985 | Nagel | 335/13 |
| 4,541,032 | 9/1985 | Schwab | 361/331 |
| 4,546,224 | 10/1985 | Mostosi | 200/153 G |
| 4,550,360 | 10/1985 | Dougherty | 361/93 |
| 4,562,419 | 12/1985 | Preuss et al. | 335/195 |
| 4,589,052 | 5/1986 | Dougherty | 361/94 |
| 4,595,812 | 6/1986 | Tamaru et al. | 200/307 |
| 4,611,187 | 9/1986 | Banfi | 335/16 |
| 4,612,430 | 9/1986 | Sloan et al. | 200/327 |
| 4,616,198 | 10/1986 | Pardini | 335/16 |
| 4,622,444 | 11/1986 | Kandatsu et al. | 200/303 |
| 4,631,625 | 12/1986 | Alexander et al. | 361/94 |
| 4,642,431 | 2/1987 | Tedesco et al. | 200/153 G |
| 4,644,438 | 2/1987 | Puccinelli et al. | 361/75 |
| 4,649,247 | 3/1987 | Preuss et al. | 200/244 |
| 4,658,322 | 4/1987 | Rivera | 361/37 |
| 4,672,501 | 6/1987 | Bilac et al. | 361/96 |
| 4,675,481 | 6/1987 | Markowski et al. | 200/144 R |
| 4,682,264 | 7/1987 | Demeyer | 361/96 |
| 4,689,712 | 8/1987 | Demeyer | 361/96 |
| 4,694,373 | 9/1987 | Demeyer | 361/96 |
| 4,710,844 * | 12/1987 | Scott et al. | 361/96 |
| 4,710,845 | 12/1987 | Demeyer | 361/96 |
| 4,717,985 | 1/1988 | Demeyer | 361/96 |
| 4,733,211 | 3/1988 | Castonguay et al. | 335/192 |
| 4,733,321 | 3/1988 | Lindeperg | 361/96 |
| 4,741,002 * | 4/1988 | Dougherty | 377/49 |
| 4,764,650 | 8/1988 | Bur et al. | 200/153 G |
| 4,768,007 | 8/1988 | Mertz et al. | 335/202 |
| 4,780,786 | 10/1988 | Weynachter et al. | 361/87 |
| 4,782,422 * | 11/1988 | Jones et al. | 361/87 |
| 4,831,221 | 5/1989 | Yu et al. | 200/553 |
| 4,870,531 | 9/1989 | Danek | 361/93 |
| 4,883,931 | 11/1989 | Batteux et al. | 200/148 R |
| 4,884,047 | 11/1989 | Baginski et al. | 335/10 |
| 4,884,164 | 11/1989 | Dziura et al. | 361/97 |
| 4,900,882 | 2/1990 | Bernard et al. | 200/147 R |
| 4,910,485 | 3/1990 | Bolongeat-Mobleu et al. | 335/195 |
| 4,914,541 | 4/1990 | Tripodi et al. | 361/94 |
| 4,916,420 | 4/1990 | Bartolo et al. | 335/172 |
| 4,916,421 | 4/1990 | Pardini et al. | 335/185 |
| 4,926,282 | 5/1990 | McGhie | 361/102 |
| 4,935,590 | 6/1990 | Malkin et al. | 200/148 A |
| 4,937,706 | 6/1990 | Schueller et al. | 361/396 |
| 4,939,492 | 7/1990 | Raso et al. | 335/42 |
| 4,943,691 | 7/1990 | Mertz et al. | 200/151 |
| 4,943,888 | 7/1990 | Jacob et al. | 361/96 |
| 4,950,855 | 8/1990 | Bolonegeat-Mobleu et al. | 200/148 A |
| 4,951,019 | 8/1990 | Gula | 335/166 |
| 4,952,897 | 8/1990 | Barnel et al. | 335/147 |
| 4,958,135 | 9/1990 | Baginski et al. | 335/8 |
| 4,965,543 | 10/1990 | Batteux | 335/174 |
| 4,983,788 | 1/1991 | Pardini | 200/16 R |
| 5,001,313 | 3/1991 | Leclerq et al. | 200/148 B |
| 5,004,878 | 4/1991 | Seymour et al. | 200/144 R |
| 5,029,301 | 7/1991 | Nebon et al. | 335/16 |
| 5,030,804 | 7/1991 | Abri | 200/323 |
| 5,057,655 | 10/1991 | Kersusan et al. | 200/148 B |
| 5,077,627 | 12/1991 | Fraisse | 361/93 |
| 5,083,081 | 1/1992 | Barrault et al. | 324/126 |
| 5,095,183 | 3/1992 | Raphard et al. | 200/148 A |
| 5,103,198 | 4/1992 | Morel et al. | 335/6 |
| 5,115,371 | 5/1992 | Tripodi | 361/106 |
| 5,120,921 | 6/1992 | DiMarco et al. | 200/401 |
| 5,132,865 | 7/1992 | Mertz et al. | 361/6 |
| 5,138,121 | 8/1992 | Streich et al. | 200/293 |
| 5,140,115 | 8/1992 | Morris | 200/308 |
| 5,153,802 | 10/1992 | Mertz et al. | 361/18 |
| 5,155,315 | 10/1992 | Malkin et al. | 200/148 R |
| 5,166,483 | 11/1992 | Kersusan et al. | 200/144 A |
| 5,172,087 | 12/1992 | Castonguay et al. | 335/160 |
| 5,178,504 | 1/1993 | Falchi | 411/553 |
| 5,184,717 | 2/1993 | Chou et al. | 200/401 |
| 5,187,339 | 2/1993 | Lissandrin | 200/148 F |
| 5,198,956 | 3/1993 | Dvorak | 361/106 |
| 5,200,724 | 4/1993 | Gula et al. | 335/166 |
| 5,210,385 | 5/1993 | Morel et al. | 200/146 R |
| 5,239,150 | 8/1993 | Bolongeat-Mobleu et al. | 200/148 R |
| 5,260,533 | 11/1993 | Livesey et al. | 200/401 |
| 5,262,744 | 11/1993 | Arnold et al. | 335/8 |
| 5,280,144 | 1/1994 | Bolongeat-Mobleu et al. | 200/148 R |
| 5,281,776 | 1/1994 | Morel et al. | 200/144 |
| 5,296,660 | 3/1994 | Morel et al. | 200/146 R |
| 5,296,664 | 3/1994 | Crookston et al. | 200/401 |
| 5,298,874 | 3/1994 | Morel et al. | 335/8 |
| 5,300,907 | 4/1994 | Nereau et al. | 335/172 |
| 5,310,971 | 5/1994 | Vial et al. | 200/244 |
| 5,313,180 | 5/1994 | Vial et al. | 335/16 |
| 5,317,471 | 5/1994 | Izoard et al. | 361/105 |
| 5,331,500 | 7/1994 | Corcoles et al. | 361/93 |
| 5,334,808 | 8/1994 | Bur et al. | 200/50 |
| 5,341,191 | 8/1994 | Crookston et al. | 335/16 |
| 5,347,096 | 9/1994 | Bolongeat-Mobleu et al. | 200/148 B |
| 5,347,097 | 9/1994 | Bolongeat-Mobleu et al. | 200/148 B |
| 5,350,892 | 9/1994 | Rozier | 200/144 B |
| 5,357,066 | 10/1994 | Morel et al. | 200/17 R |
| 5,357,068 | 10/1994 | Rozier | 200/148 R |
| 5,357,394 | 10/1994 | Piney | 361/72 |
| 5,361,052 | 11/1994 | Ferullo et al. | 335/172 |
| 5,373,130 | 12/1994 | Barrault et al. | 200/147 R |
| 5,379,013 | 1/1995 | Coudert | 335/17 |
| 5,424,701 | 6/1995 | Castonguary et al. | 335/172 |
| 5,438,176 | 8/1995 | Bonnardel et al. | 200/400 |
| 5,440,088 | 8/1995 | Coudert et al. | 200/303 |
| 5,449,871 | 9/1995 | Batteux et al. | 200/401 |
| 5,450,048 | 9/1995 | Leger et al. | 335/132 |
| 5,451,729 | 9/1995 | Onderka et al. | 200/18 |
| 5,457,295 | 10/1995 | Tanibe et al. | 200/293 |
| 5,467,069 | 11/1995 | Payet-Burin et al. | 335/42 |
| 5,469,121 | 11/1995 | Payet-Burin | 335/16 |
| 5,475,558 | 12/1995 | Barjonnet et al. | 361/64 |
| 5,477,016 | 12/1995 | Baginski et al. | 200/43.11 |

| | | | |
|---|---|---|---|
| 5,479,143 | 12/1995 | Payet-Burin ...................... 335/202 |
| 5,483,212 | 1/1996 | Lankuttis et al. ................. 335/132 |
| 5,485,343 | 1/1996 | Santos et al. ..................... 361/115 |
| 5,493,083 | 2/1996 | Olivier ............................. 200/17 R |
| 5,504,284 | 4/1996 | Lazareth et al. ................. 200/50 R |
| 5,504,290 | 4/1996 | Baginski et al. ................. 200/401 |
| 5,510,761 | 4/1996 | Boder et al. ...................... 335/172 |
| 5,512,720 | 4/1996 | Coudert et al. ................... 200/400 |
| 5,515,018 | 5/1996 | DiMarco et al. .................. 335/16 |
| 5,519,561 | 5/1996 | Mrenna et al. ................... 361/105 |
| 5,534,674 | 7/1996 | Steffens ............................ 218/154 |
| 5,534,832 | 7/1996 | Duchemin et al. ............... 335/16 |
| 5,534,835 | 7/1996 | McColloch et al. .............. 335/172 |
| 5,534,840 | 7/1996 | Cuingnet ........................... 337/1 |
| 5,539,168 | 7/1996 | Linzenich ......................... 200/303 |
| 5,543,595 | 8/1996 | Mader et al. ..................... 200/401 |
| 5,552,755 | 9/1996 | Fello et al. ....................... 335/18 |
| 5,581,219 | 12/1996 | Nozawa et al. .................. 335/132 |
| 5,604,656 | 2/1997 | Derrick et al. ................... 361/187 |
| 5,608,367 | 3/1997 | Zoller et al. ..................... 335/132 |
| 5,627,717 * | 5/1997 | Pein et al. ........................ 361/95 |
| 5,784,233 | 7/1998 | Bastard et al. ................... 361/36 |
| 5,943,201 * | 8/1999 | Walker et al. .................... 361/64 |

FOREIGN PATENT DOCUMENTS

| | | |
|---|---|---|
| 44 19 240 | 1/1995 | (DE) . |
| 0 061 092 | 9/1982 | (EP) . |
| 0 064 906 | 11/1982 | (EP) . |
| 0 066 486 | 12/1982 | (EP) . |
| 0 076 719 | 4/1983 | (EP) . |
| 0 117 094 | 8/1984 | (EP) . |
| 0 140 761 | 5/1985 | (EP) . |
| 0 174 904 | 3/1986 | (EP) . |
| 0 196 241 | 10/1986 | (EP) . |
| 0 224 396 | 6/1987 | (EP) . |
| 0 235 479 | 9/1987 | (EP) . |
| 0 239 460 | 9/1987 | (EP) . |
| 0 258 090 | 3/1988 | (EP) . |
| 0 264 313 | 4/1988 | (EP) . |
| 0 264 314 | 4/1988 | (EP) . |
| 0 283 189 | 9/1988 | (EP) . |
| 0 283 358 | 9/1988 | (EP) . |
| 0 291 374 | 11/1988 | (EP) . |
| 0 295 155 | 12/1988 | (EP) . |
| 0 295 158 | 12/1988 | (EP) . |
| 0 309 923 | 4/1989 | (EP) . |
| 0 313 106 | 4/1989 | (EP) . |
| 0 313 422 | 4/1989 | (EP) . |
| 0 314 540 | 5/1989 | (EP) . |
| 0 331 586 | 9/1989 | (EP) . |
| 0 337 900 | 10/1989 | (EP) . |
| 0 342 133 | 11/1989 | (EP) . |
| 0 367 690 | 5/1990 | (EP) . |
| 0 371 887 | 6/1990 | (EP) . |
| 0 375 568 | 6/1990 | (EP) . |
| 0 394 144 | 10/1990 | (EP) . |
| 0 394 922 | 10/1990 | (EP) . |
| 0 399 282 | 11/1990 | (EP) . |
| 0 407 310 | 1/1991 | (EP) . |
| 0 452 230 | 10/1991 | (EP) . |
| 0 555 158 | 8/1993 | (EP) . |
| 0 567 416 | 10/1993 | (EP) . |
| 0 595 730 | 5/1994 | (EP) . |
| 0 619 591 | 10/1994 | (EP) . |
| 0 665 569 | 8/1995 | (EP) . |
| 0 700 140 | 3/1996 | (EP) . |
| 2 410 353 | 6/1979 | (FR) . |
| 2 512 582 | 3/1983 | (FR) . |
| 2 553 943 | 4/1985 | (FR) . |
| 2 592 998 | 7/1987 | (FR) . |
| 2 682 531 | 4/1993 | (FR) . |
| 2 697 670 | 5/1994 | (FR) . |
| 2 699 324 | 6/1994 | (FR) . |
| 2 714 771 | 7/1995 | (FR) . |
| 2 233 155 | 1/1991 | (GB) . |
| 1 227 978 | 4/1986 | (SU) . |
| 92/00598 | 1/1992 | (WO) . |
| 92/05649 | 4/1992 | (WO) . |
| 94/00901 | 1/1994 | (WO) . |

* cited by examiner

ELECTRONIC TRIP UNIT WITH USER-ADJUSTABLE SENSITIVITY TO CURRENT SPIKES

BACKGROUND OF THE INVENTION

The present invention relates generally to circuit breaker trip units. More specifically, the present invention relates to an electronic trip unit with adjustable sensitivity to current spikes.

The use of electronic trip units in electric circuit breakers is well known. Trip units can be used for, among other purposes, providing short circuit protection to an electrical distribution circuit. In this capacity, the trip unit samples current in the power lines of the distribution system to detect a short circuit. If a short is detected, the trip unit provides a trip signal to an actuating device, such as a trip solenoid, within the circuit breaker. Upon receiving the trip signal, the actuating device separates a pair of contacts within the circuit breaker to open the distribution circuit and protect the distribution circuit from damage caused by the short circuit.

The construction of an electronic trip unit is also known. Electronic trip units typically comprise voltage and/or current sensors, which provide analog signals indicative of the power line signals. The analog signals are converted by an A/D (analog/digital) converter to digital signals, which are processed by a signal processor. Electronic trip units further include RAM (random access memory), ROM (read only memory) and may also include EEPROM (electronic erasable programmable read only memory) all of which interface with the signal processor.

To detect short circuits in the distribution circuit, trip units monitor peaks in the current within the power lines. Generally, trip units compare the current in the power lines to some threshold value. For example, this threshold value may be seven times the rated current of the circuit breaker. If the current in the power lines exceeds this threshold value, indicating a short circuit, the trip unit generates the trip signal.

FIG. 1 shows a current waveform of fundamental frequency. In the waveform shown, the current peak is higher than the threshold value and, therefore, this waveform is indicative of a short in the circuit. A trip unit would generate a trip signal if the waveform of FIG. 1 were detected. FIG. 2, however, shows a current waveform with current spikes caused by high harmonic content or noise. Such current spikes can cause the circuit breaker to trip, even where no short circuit exists. Trips caused by these current spikes can be a nuisance.

Attempts have been made to overcome this problem by using processing algorithms to filter out the current spikes. While such is well suited for certain applications, such as drive systems, where current spikes are commonly generated, it is problematic in other applications, such as high-frequency systems (e.g., 400 Hz systems or resistive load circuits), where the user desires the trip unit to trip in response to such current spikes.

BRIEF SUMMARY OF THE INVENTION

In an exemplary embodiment of the invention, a circuit breaker trip unit with user-adjustable sensitivity to current spikes comprises a microprocessor arranged for receiving a line signal indicative of current within an electrical distribution circuit. The microprocessor compares the line signal to a predetermined threshold value. If the line signal exceeds the threshold value, the microprocessor increments a peak count. A user-adjustable switch is arranged to provide the microprocessor with a limit value. When the peak count reaches this limit value, a trip signal is generated by the microprocessor. User-adjustable sensitivity to current spikes is beneficial, as it allows the user to tailor the sensitivity of the trip unit to a particular application. For example, it allows the user to decrease sensitivity for applications, such as drive systems, where current spikes are commonly generated. Conversely, the user can increase sensitivity for applications, such as high-frequency systems (e.g., 400 Hz systems or resistive load circuits), where maximum sensitivity is desired.

BRIEF DESCRIPTION OF THE DRAWINGS

The present invention will now be described, by way of example only, with reference to the accompanying drawing in which.

DETAILED DESCRIPTION OF THE INVENTION

Figure 1:
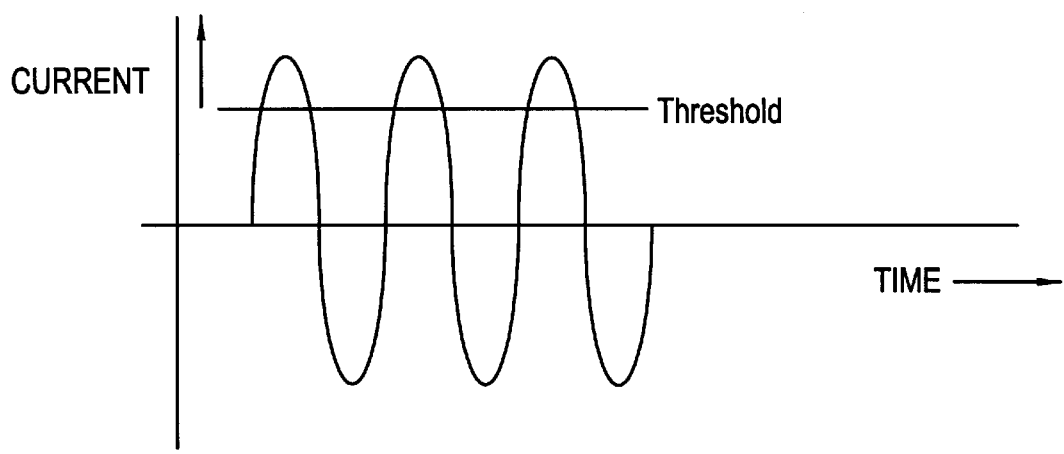
FIG. 1 is a current waveform of fundamental frequency.
Figure 2:
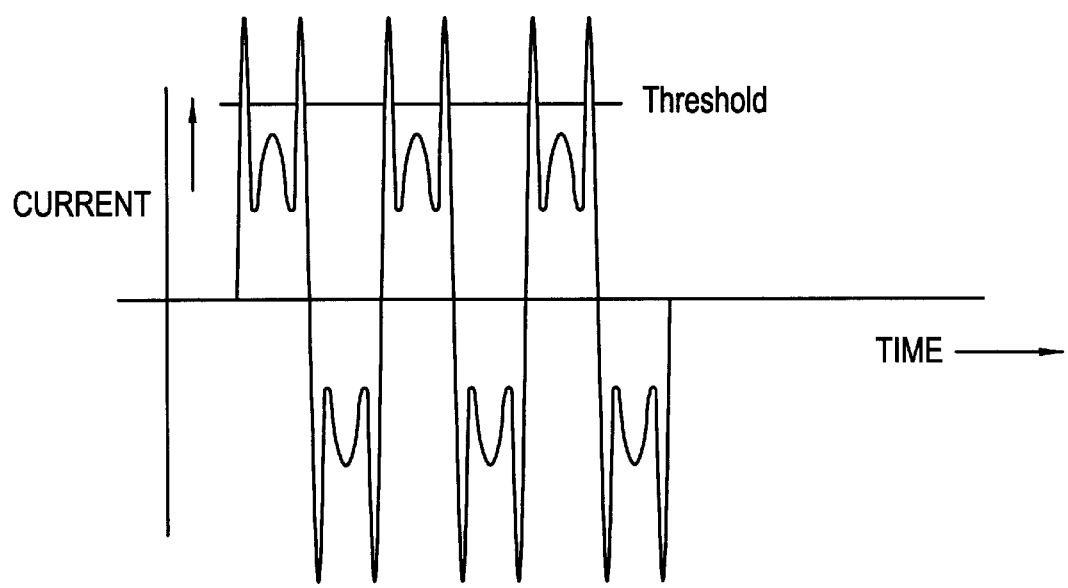
FIG. 2 is a current waveform with current spikes.
Figure 3:
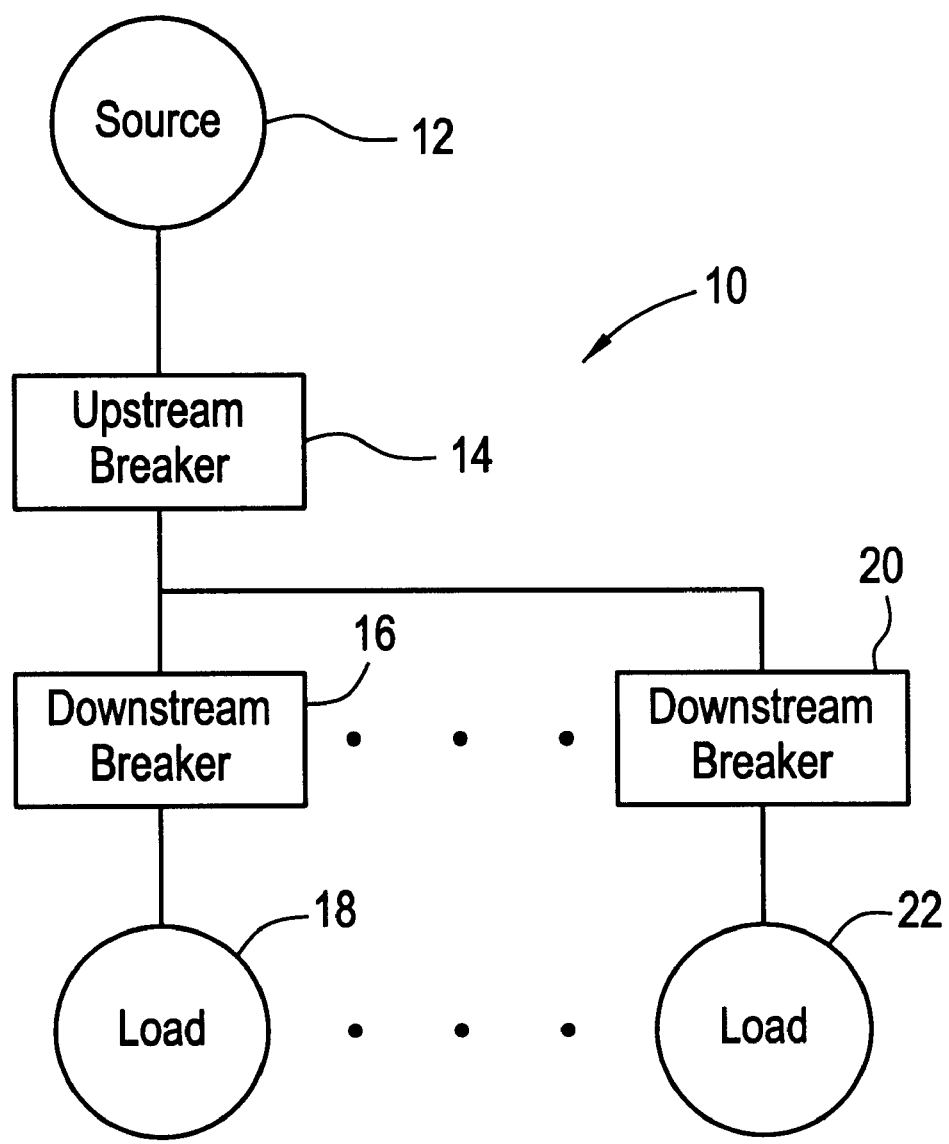
FIG. 3 is a schematic block diagram of a electric power distribution circuit.

Referring to FIG. 3, an electrical power distribution circuit is generally shown at 10. Distribution circuit 10 comprises a source 12, an upstream circuit breaker 14, a downstream circuit breaker 16 and at least one corresponding load 18. Any number of additional downstream circuit breakers 20 with corresponding loads 22 may be included. It will be appreciated that breakers 14, 16, and 20 may be of similar construction.

Figure 4:
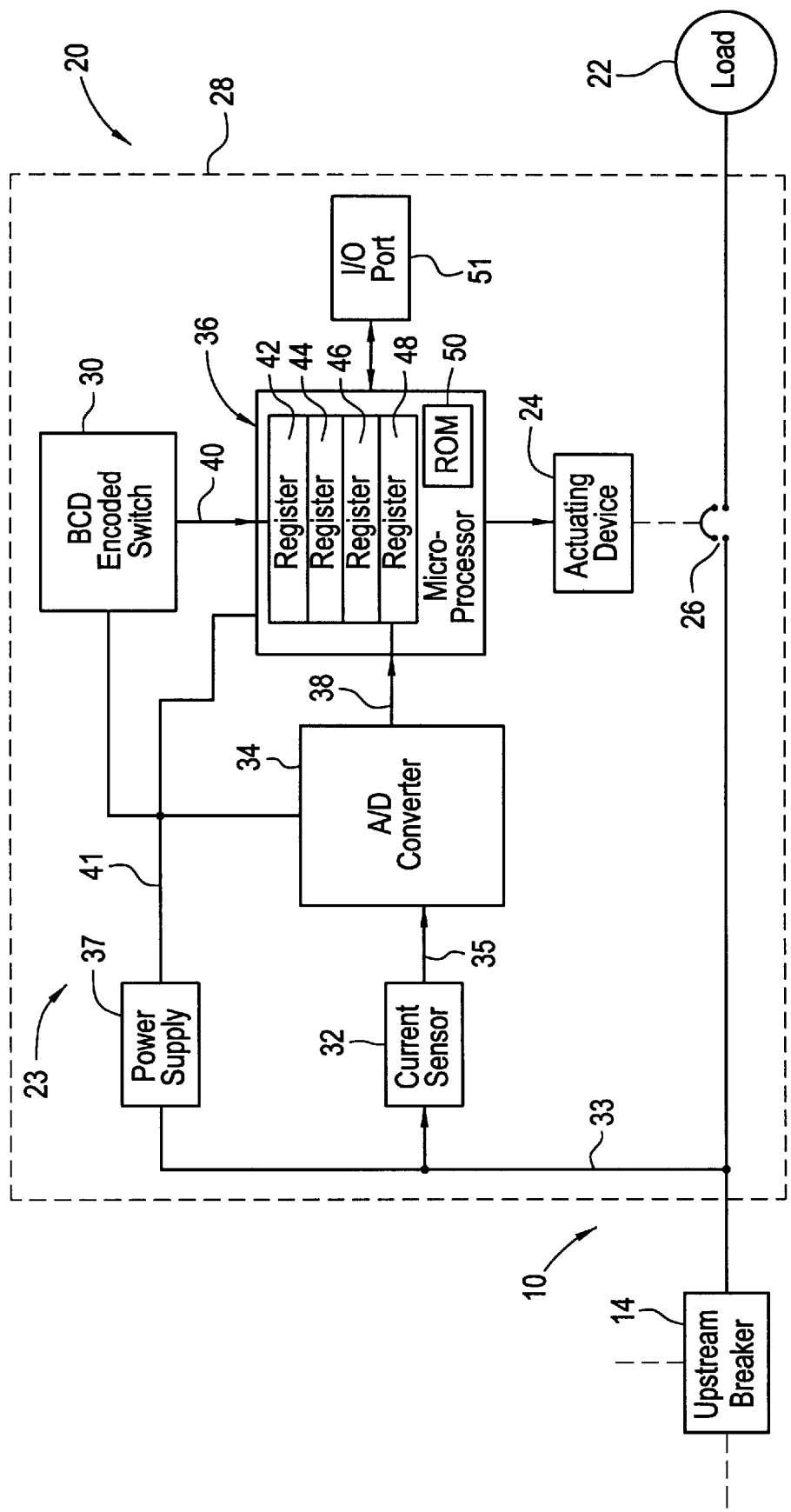
FIG. 4 is a schematic block diagram of a circuit breaker with an electronic trip unit of the present invention.

Referring to FIG. 4, a general schematic of a circuit breaker is generally shown at 20. Circuit breaker 20 comprises a trip unit 23, actuating device 24, and contacts 26 all mounted within housing 28. Contacts 26 form part of distribution circuit 10 and are mechanically connected to actuating device 24. Actuating device 24 is arranged to receive a trip signal from trip unit 23, which is electrically connected to distribution circuit 10. Upon receiving the trip signal, the actuating device 24 separates contacts 26 to stop the flow of current in a portion of the distribution circuit 10.

Trip unit 23 comprises a user-adjustable switch 30, a current sensor 32, an analog-to-digital (A/D) converter 34, a microprocessor 36, and a power supply 37. Power supply 37 is typically fed from the secondary of current sensor 32. Current sensor 32 is electrically connected to distribution circuit 10 by a line 33 and provides analog signals indicative of current measurements in distribution circuit 10 to A/D converter 34, via a line 35. A/D converter 34 converts the analog signal to a digital line signal and presents the digital line signal, via bus 38, to microprocessor 36. Power supply 37 is electrically connected to distribution circuit 10 by line 33 for providing operating power to A/D converter 34, switch 30, and microprocessor 36, via a line 41.

User-adjustable switch 30 is arranged to provide a signal indicative of a limit value, via bus 40, to microprocessor 36. The user-adjustable switch 30, for example, may be a binary coded decimal (BCD) encoded switch that allows the user of the circuit breaker to alter the limit value provided to the microprocessor 36. Alternately, the user-adjustable switch 30 may comprise a jumper bit or a user-selectable option in non-volatile memory such as ROM (read only memory) 50.

Microprocessor 36 comprises a plurality of registers 42–48 and ROM 50 internal thereto. ROM 50 includes trip unit application code, e.g., main functionality firmware, including initializing parameters, boot code, and a short circuit protection algorithm. The plurality of registers 42–48 comprises a register 48 for storing the line signal provided by the A/D converter 34, a register 42 for storing the limit value provided by switch 30, and registers 44 and 46 for use by the microprocessor 36 in executing the short circuit protection algorithm. It will be appreciated that RAM (random access memory), EEPROM (electronic erasable programmable read only memory) or any combination thereof may be employed by the microprocessor 36 for memory purposes, as is well known. The EEPROM would include, e.g., operational parameters for the application code. It will also be appreciated that ROM 50 may be external to the microprocessor 36, as is well known. Further, communications within trip unit 22 can be provided through a communications I/O port 51.

Figure 5:
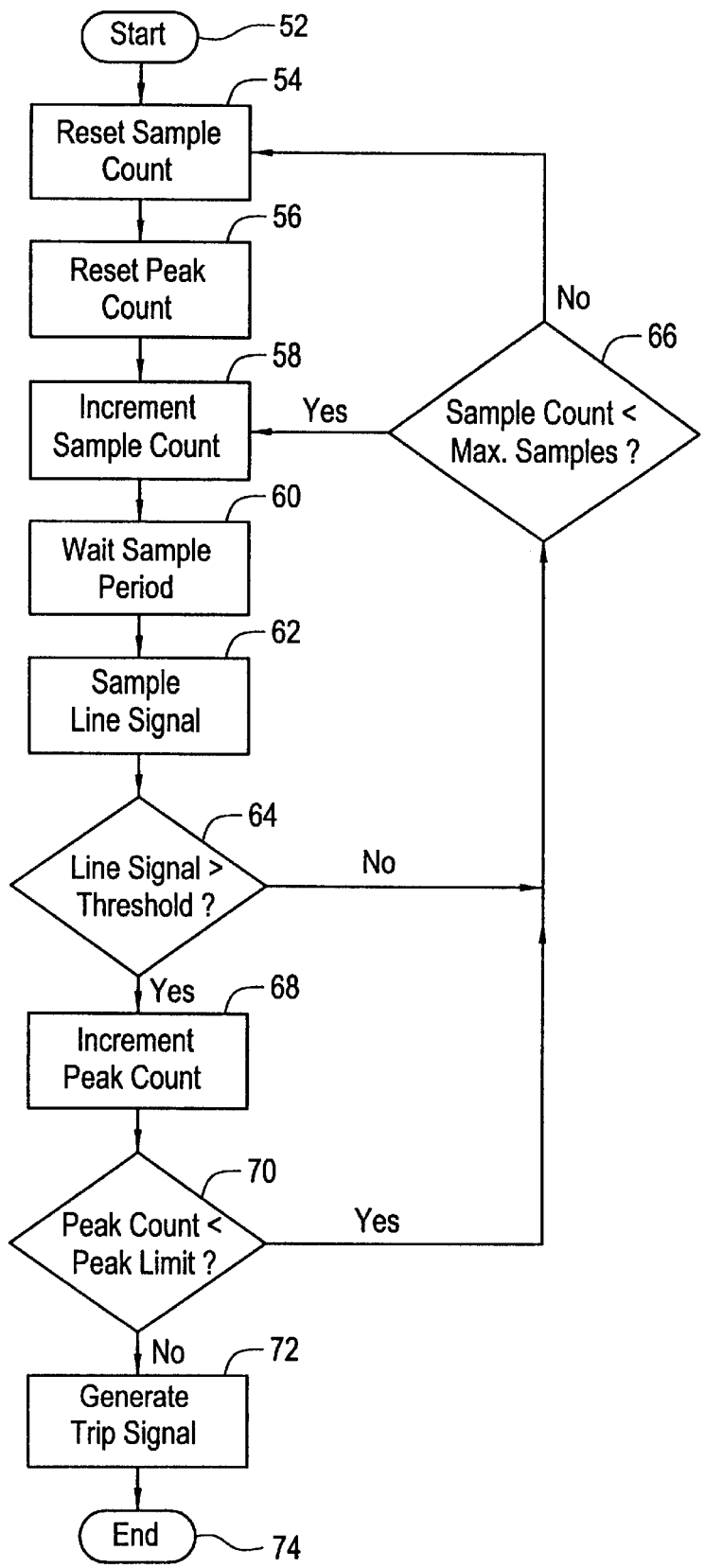
FIG. 5 is a flow diagram of a short circuit protection program of the present invention.

Referring to FIG. 5, the short circuit protection algorithm (program) is applied to each of the phases of the power lines in distribution circuit 10. The program is initiated preferably from the boot code at start-up, block 52, and proceeds immediately to block 54. At block 54 the program resets a sample count value stored in register 44 to zero. The program continues to block 56 where a peak count value stored in register 46 is reset to zero. At block 58, the program increments the sample count value in register 44. The program then waits a predetermined sample period, block 60, and then proceeds to block 62 where a line signal in register 48 is sampled. The sample period is a parameter stored in ROM 50 and is equal to a fraction of the half-cycle of the current frequency in the distribution circuit 10. For example, the sample period might be one-eighth of the half-cycle time. Thus, the line signal is sampled eight times per half-cycle (see, e.g., FIGS. 6 and 7).

At block 64, the program compares the line signal stored in register 48 to a threshold value (e.g., seven times the rated current) stored in ROM 50. If the line signal, which is indicative of the current level in the distribution circuit 10, is less than the threshold value, the program continues to block 66. At block 66, the program compares the sample count value in register 44 to a maximum sample value stored in ROM 50. The maximum sample value is equal to the number of samples per half-cycle of the current frequency in the distribution circuit. Using the example above, the maximum sample value would be eight. If the sample count value in register 44 is less than the maximum sample value, the program loops to block 58 where it increments the value in the sample count register 44 (to continue sampling the same half-cycle). If the sample count is equal to the maximum, the program loops to block 54 where it resets the sample count value in register 44 to zero (to begin a new half-cycle).

Referring again to block 64, if the line signal stored in register 48 is greater than the threshold value stored in ROM 50, the program continues to block 68 where it increments the peak count value in register 46. At block 70, the program compares the peak count value in register 46 to the peak limit value in register 42. If the peak count value is less than the peak limit value, the program continues to block 66 where, as described above, the same half-cycle is sampled again or sampling of a new half-cycle begins. If the peak count value is equal to the peak limit value, the program continues to block 72, where it initiates a trip signal. The program then ends at block 74.

Figure 6:
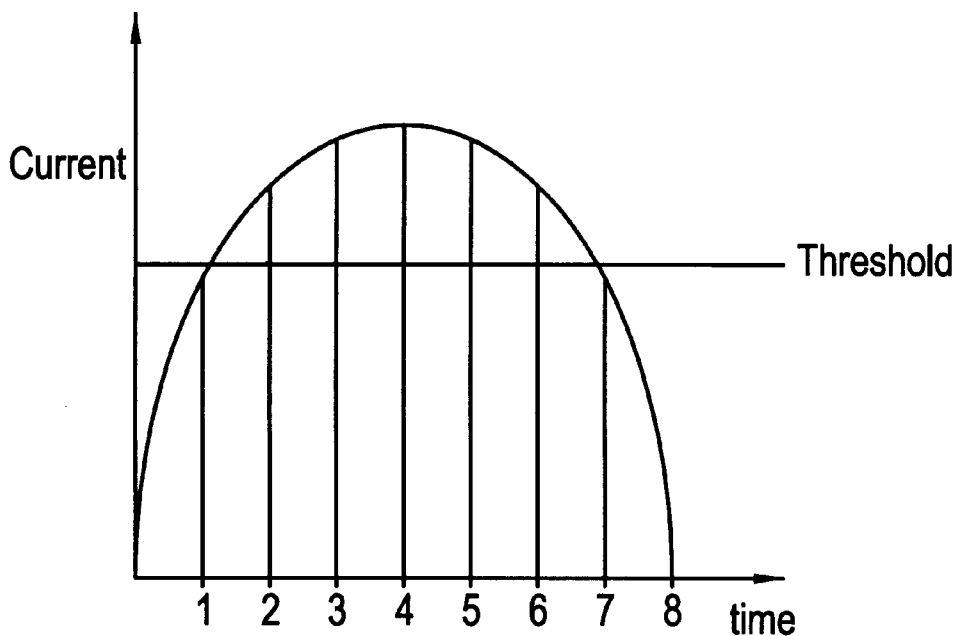
FIG. 6 is a current waveform of fundamental frequency with a plurality of samples for each half cycle.
Figure 7:
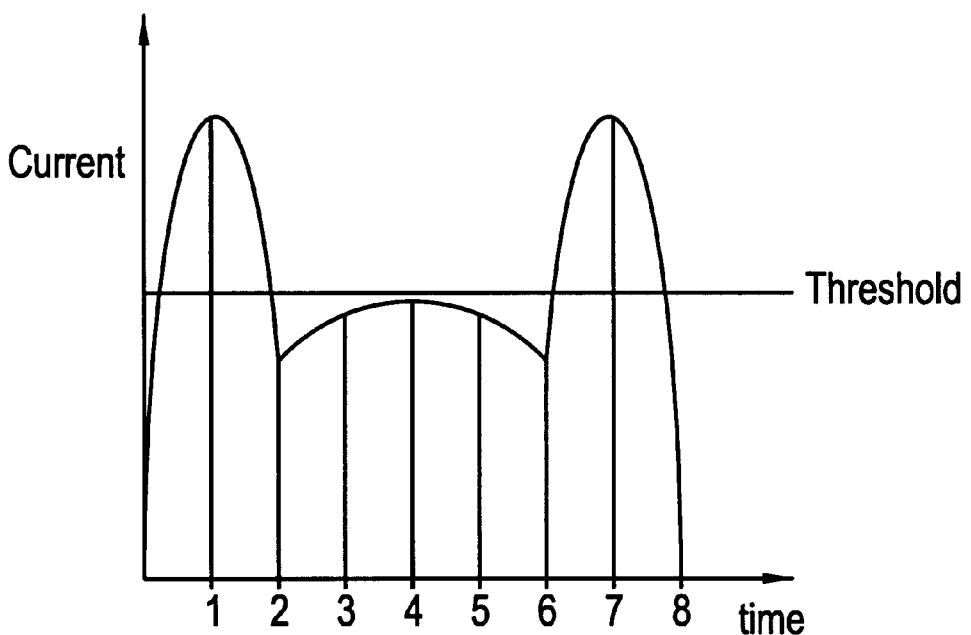
FIG. 7 is a current waveform with current spikes and with a plurality of samples for each half cycle in accordance with the present invention.

FIGS. 6 and 7 show examples of a current signal sampled eight times per half-cycle. FIG. 6 represents a half-cycle with five line signals (samples) over the threshold value. In the short circuit detection algorithm of FIG. 5, if the peak limit value stored in register 42, as set by the user-adjustable switch 30, is five or less, the half-cycle shown in FIG. 6 would cause the breaker to trip. If set to six or higher, the breaker would not trip. FIG. 7 represents a half-cycle with two line signals (samples) over the threshold value. In this case, if the user set the peak limit to three or greater, the breaker would not trip. As shown in these examples, the user can adjust the sensitivity of the trip unit to current spikes by adjusting the switch 30.

Figure 8:
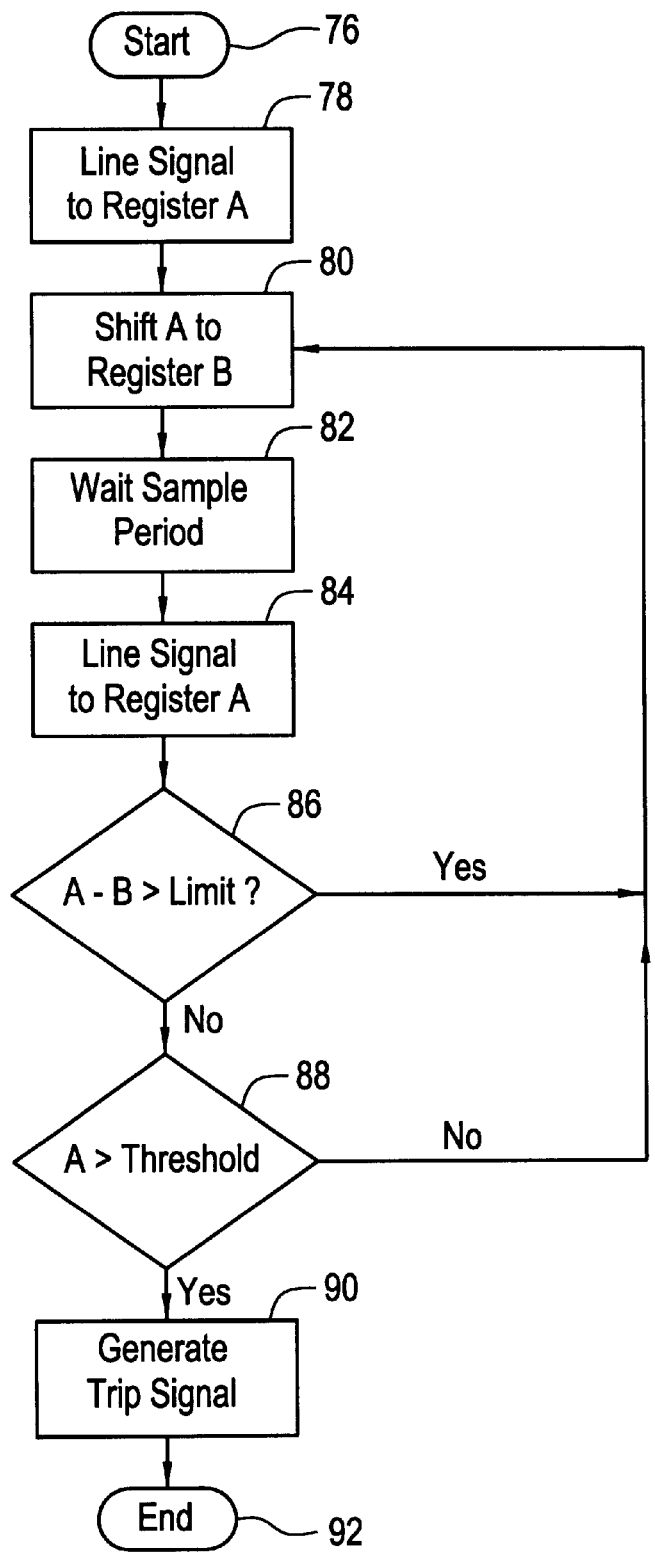
FIG. 8 is a flow diagram of an alternate method of short circuit protection of the present invention.

Alternately, the short circuit protection algorithm (program) shown in FIG. 8 may be applied to each of the phases of the power lines in distribution circuit 10. The program is initiated preferably from the boot code at start-up, block 76, and proceeds immediately to block 78. At block 78, the program samples the line signal in register 48. The program then continues to block 80 where it shifts the line signal stored in register 48 to register 46 and then continues to block 82. At block 82, the program waits a predetermined sample period, and then proceeds to block 84 where a new line signal in register 48 is sampled. The sample period is a parameter stored in ROM 50 and is equal to a fraction of the half-cycle of the current frequency in the distribution circuit 10. For example, the sample period might be one-eighth of the half-cycle time, such that the line signal is sampled eight times per half-cycle.

At block 86, the program calculates the quantitative difference between the previous line signal in register 46 and the current line signal in register 48. The difference is compared to the limit value provided by the user-adjustable switch 30 and stored in register 42. For example, the limit value may be equal to seven times the rated current. If the difference is greater than the limit value, the program loops back to block 80. If the difference is less than the limit value, the program continues to block 88 where the line signal in register 48 is compared against a known threshold value (e.g., seven times the rated current) stored in ROM 50. If the line signal in register 48 is less than the threshold value, the program loops back to block 80. If the line signal in register 48 is greater than the threshold value, the program continues to block 90, where it initiates a trip signal. The program then ends at block 92.

The short circuit protection algorithm of FIG. 8 uses the rate of rise of two consecutive samples to detect current spikes. If the rate of rise is too steep (i.e., if the quantitative difference between the current and previous line signals is greater than the limit value) this indicates a current spike. The user can adjust the sensitivity of the trip unit to current spikes by adjusting the limit value using switch 30. If the user desires high sensitivity, the user can adjust switch 30 to increase the limit value. Sensitivity can be reduced by decreasing the limit value.

The short circuit protection algorithms of FIGS. 5 and 8 may further comprise a power-up feature that sets the trip unit for high sensitivity during power-up and reduces the sensitivity during running state. This feature, for example, can be used on the portions of distribution systems that service electric drive motors. Alternately, switch 30 may include a setting feature that would adjust the trip unit for use in a 400 Hz application, where maximum sensitivity is needed.

The trip unit of the above-described invention allows the user of the circuit breaker to adjust the trip unit's sensitivity to current spikes. This feature allows the user to decrease sensitivity for applications such as drive systems, where current spikes are generated, and to increase sensitivity for applications such as high-frequency systems, where maximum sensitivity is needed.

All of the aforementioned limits, settings or thresholds may be stored in any non-volatile memory or an EEPROM which can be altered by downloading desired settings via communications I/O port 51. This would include remotely downloading such data when the unit is connected to a system computer (not shown), either directly, over telephone lines, or any other suitable connection. It may also be preferred that such EEPROM comprises a flash memory whereby such data is flashed, as is well known.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of protection in an electronic trip unit, the method comprising the steps of:

(a) selecting a limit value;

(b) resetting a sample count;

(c) resetting a peak count;

(d) incrementing the sample count;

(e) sensing an electrical signal to provide a sensed signal indicative of an electrical characteristic of the electrical signal;

(f) comparing said sensed signal to a threshold;

(g) incrementing the peak count when said sensed signal exceeds said threshold;

(h) if said sensed signal does not exceed said threshold, comparing the sample count to a maximum number of samples;

(i) if the sample count is less than the maximum number of samples. returning to step (d);

(j) if the sample count is not less than the maximum number of samples, returning to step (b);

(k) generating a trip signal when said peak count reaches said limit value;

(l) if the peak count is less than the limit value, comparing the sample count to the maximum number of samples and returning to step (i).

2. The method of claim 1 wherein said selecting said limit value comprises selecting said limit value using a switch.

3. The method of claim 1 further comprising:
    sensing the electrical signal a plurality of times each half-cycle of the electrical signal.

4. The method of claim 3 further comprising:
    resetting the peak count each half-cycle of the electrical signal.

5. The method of claim 1 wherein said electrical characteristic comprise electrical current.

6. An electronic trip unit comprising:

a switch for selecting a limit value;

a sensor for sensing an electrical signal to provide a sensed signal indicative of an electrical characteristic of the electrical signal; and a signal processor responsive to said sensed signal, the signal processor having a first register for storing the limit value, a second register for storing a sample count, a third register for storing a peak count, and a fourth register for storing the sensed signal, the signal processor further having memory for storing signals including program signals defining an executable program for, comparing said sensed signal to a threshold, incrementing the sample count at each sensed signal, incrementing the peak count when said sensed signal exceeds said threshold, generating a trip signal when said peak count reaches said limit value, repeating the program if the sample count is less than a maximum number of samples, and resetting the sample count and the peak count if the sample count is not less than a maximum number of samples.

7. The electronic trip unit of claim 6 wherein said switch comprises a binary coded decimal encoded switch.

8. The electronic trip unit of claim 6 wherein said switch comprises a jumper bit option.

9. The electronic trip unit of claim 6, wherein said switch comprises an option in a non-volatile memory.

10. The electronic trip unit of claim 6 wherein said program signals further define said executable program for sensing the electrical signal a plurality of times each half-cycle of the electrical signal.

11. The electronic trip unit of claim 10 wherein said program signals further define said executable program for resetting the peak count each half-cycle of the electrical signal.

12. The electronic trip unit of claim 6 further comprising:
    a communication port for communicating signals external of said electronic trip unit to said signal processor for remotely setting at least one of said threshold and said switch, whereby remotely setting said switch remotely selects said limit value.

13. A selective system including at least one electronic trip unit wherein said at least one electronic trip unit comprise the electronic trip unit of claim 6.

14. A method of protection in an electronic trip unit, comprising:

selecting a limit value;

sensing an electrical signal to provide corresponding first and second sensed signals, each indicative of an electrical characteristic of the electrical signal;

comparing said first and second sensed signals to determine a rate of rise of said electrical characteristic;

comparing said rate of rise to said limit value to detect a spike in said electrical characteristic; and generating a trip signal when said rate of rise is greater than said limit value.

15. The method of claim 14 wherein said selecting said limit value comprise selecting said limit value using a switch.

16. The method of claim 14 wherein said electrical characteristic comprise electrical current.

17. An electronic trip unit comprising:

a switch for selecting a limit value;

a sensor for sensing an electrical signal to provide first and second sensed signals, each indicative of an electrical characteristic of the electrical signal; and a signal processor responsive to said sensed signals, and having memory for storing signals including program signals defining an executable program for, comparing said first and second sensed signals to determine a rate of rise of said electrical characteristic, comparing said rate of rise to said limit value to detect a spike in said electrical characteristic, and generating a trip signal when said rate of rise is greater than said limit value.

18. The electronic trip unit of claim 17 wherein said switch comprises a binary coded decimal encoded switch.

19. The electronic trip unit of claim 17 wherein said switch comprises a jumper bit option.

20. The electronic trip unit of claim 17 wherein said switch comprises an option in a non-volatile memory.

21. The electronic trip unit of claim 17 wherein said electrical characteristic comprise electrical current.

22. The electronic trip unit of claim 17 further comprising:

a communication port for communicating signals external of said electronic trip unit to said signal processor for remotely setting at least one of said threshold and said switch, whereby remotely setting said switch remotely selected said limit value.

23. A selective system including at least one electronic trip unit wherein said at least one electronic trip unit comprise the electronic trip unit of claim 17.

24. A method of protection in an electronic trip unit, comprising:

selecting a limit value;

sensing an electrical signal to provide a sensed signal indicative of an electrical characteristic of the electrical signal;

comparing said sense signal to a threshold;

incrementing a peak count when said sensed signal exceeds said threshold; and generating a trip signal when said peak count reaches said limit value;

wherein said selecting said limit value further comprises setting said limit value to a first number of peak counts during an initial half-cycle after the distribution circuit is powered up and then automatically increasing said limit value a second number of peak counts thereafter.

25. An electronic trip unit comprising:

a switch for selecting a limit value;

a sensor for sensing an electrical signal to provide a sensed signal indicative of an electrical characteristic of the electrical signal; and a signal processor responsive to said sensed signal, and having memory for storing signals including program signals defining an executable program for, setting said limit value to a first number of peak counts during an initial half-cycle after the distribution circuit is powered-up and then automatically increasing said limit value to a second number of peak counts thereafter, comparing said sensed signal to a threshold, incrementing a peak count when said sensed signal exceeds said threshold, and generating a trip signal when said peak count reaches said limit value.

26. A method of protection in an electronic trip unit, comprising:

selecting a limit value;

sensing an electrical signal to provide corresponding first and second sensed signals, each indicative of an electrical characteristic of the electrical signal;

comparing said first and second sensed signal to determine a rate of rise of said electrical characteristic;

comparing said rate of rise to said limit value to detect a spike in said electrical characteristic; and generating a trip signal when said rate of rise exceeds said limit value;

wherein said selecting said limit value further comprises setting said limit value to a first rate of rise during an initial half-cycle after the distribution circuit is powered-up and then automatically increasing said limit value a second rate of rise thereafter.

27. An electronic trip unit comprising:

a switch for selecting a limit value;

a sensor for sensing an electrical signal to provide first and second sensed signals, each indicative of an electrical characteristic of the electrical signal; and a signal processor responsive to said sensed signal, and having memory for storing signals including program signals defining an executable program for, comparing said first and second sensed signal to determine a rate of rise of said electrical characteristic, comparing said rate of rise to said limit value to detect a spike in said electrical characteristic, and generating a trip signal when said rate of rise exceeds said limit value, wherein setting said limit value comprises setting said limit value to a first rate of rise during an initial half-cycle after the distribution circuit is powered-up and then automatically increasing said limit value to a second rate of rise thereafter.

* * * * *